United States Patent

[11] 3,587,370

| [72] | Inventors | Gordon H. Porath<br>Brighton;<br>Anthony J. Martin, Livonia, Mich. |
|---|---|---|
| [21] | Appl. No. | 728,638 |
| [22] | Filed | May 13, 1968 |
| [45] | Patented | June 28, 1971 |
| [73] | Assignee | Babcock and Wilcox Company,<br>New York, N.Y. |

[54] MULTIPLE SPINDLE BAR AUTOMATIC MACHINE
2 Claims, 10 Drawing Figs.

| [52] | U.S. Cl. | 82/3, 82/30 |
|---|---|---|
| [51] | Int. Cl. | B23b 9/04 |
| [50] | Field of Search | 82/3, 30 |

[56] References Cited
UNITED STATES PATENTS

| 2,111,869 | 3/1938 | Montgomery | 82/30X |
| 3,223,463 | 12/1965 | Porath | 82/30X |
| 3,364,788 | 1/1968 | Schubert | 82/3X |

Primary Examiner—Leonidas Vlachos
Attorney—Barnes, Kisselle, Raisch & Choate

ABSTRACT: A multiple spindle bar automatic machine including a base and a spindle carrier for supporting circumferentially rotatable spindles. The base and spindle carrier have complementary spaced cylindrical surfaces. The cylindrical surfaces of the base are formed with circumferentially spaced pressure pads and a restrictor is associated with each said pressure pad. Fluid is supplied under pressure to each said restrictor and pressure pad.

PATENTED JUN 28 1971

INVENTORS
GORDON H. PORATH
ANTHONY J. MARTIN
BY
Barnes, Kisselle, Raisch & Choate
ATTORNEYS INVENTORS
GORDON H. PORATH
ANTHONY J. MARTIN
BY
Barnes, Kisselle, Raisch & Choate
ATTORNEYS

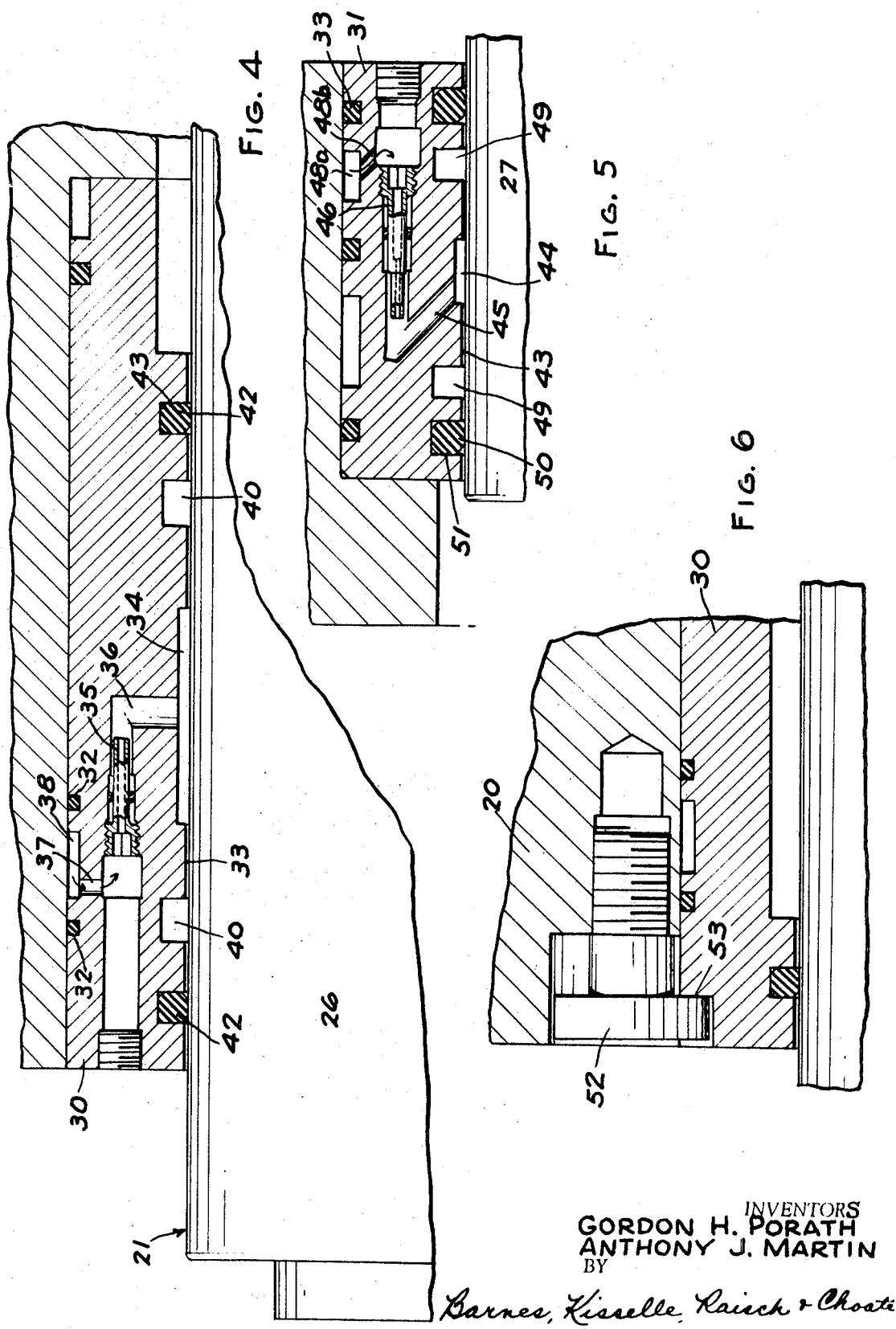

MULTIPLE SPINDLE BAR AUTOMATIC MACHINE

This invention relates to multiple spindle bar automatic machines.

Multiple spindle bar automatic machines conventionally comprise a base and a spindle carrier which rotatably supports circumferentially spaced spindles, each of which carries a workpiece for operation thereon by tools as the spindle carrier is indexed. One of the major limitations with respect to such prior machines is that it has not been possible to obtain relatively high accuracy from such machines. One of the reasons has been that the rotation of the spindles within the carrier creates heat which causes the carrier to expand and seize or otherwise adversely engage the journal in the base. As a result it has been necessary to have a relatively great clearance between the spindle carrier and the base.

It is obvious that this condition results in a very loose fit at start-up, a normally spaced assembly under nominal conditions and an excessively tight fit under hot or high load conditions. This results in greatly accelerated wear and excessive maintenance, down time, and costs. Furthermore, it introduces an extremely undesirable element of unreliability into the operation of the machine in that the different spindle clearances and the difference in thermal distortion of various machine elements produce very considerable variations in running accuracy, which directly affect the quality of parts being made by the machine.

Further, because these machine elements operate at very low speeds or at a complete stop, there is no restoring tendency to keep the moving parts centered. Thus, rapid wear and degradation of performance are experienced. Also because of the large tool forces, which propagate throughout the machine, wear is further accelerated.

Among the objects of this invention are to provide a multiple spindle bar automatic machine which will produce more accurate parts; which will produce such parts at both start up and continued operation of the machine; and which can be adapted to machines presently in use.

Further objects are to provide spindle carriers and tool slides which will not wear appreciably, to provide a heat sink which will limit the distortion of machine elements under extreme thermal conditions and to reduce direct deflection of the work and tool holding areas under the applied forces.

In the drawings:

FIG. 4 is a fragmentary sectional view on an enlarged scale taken along the line 4-4 in FIG. 3.

FIG. 5 is a fragmentary sectional view on an enlarged scale taken along the line 5-5 in FIG. 3.

FIG. 6 is a fragmentary sectional view on an enlarged scale taken along the line 6-6 in FIG. 3.

Figure 1:
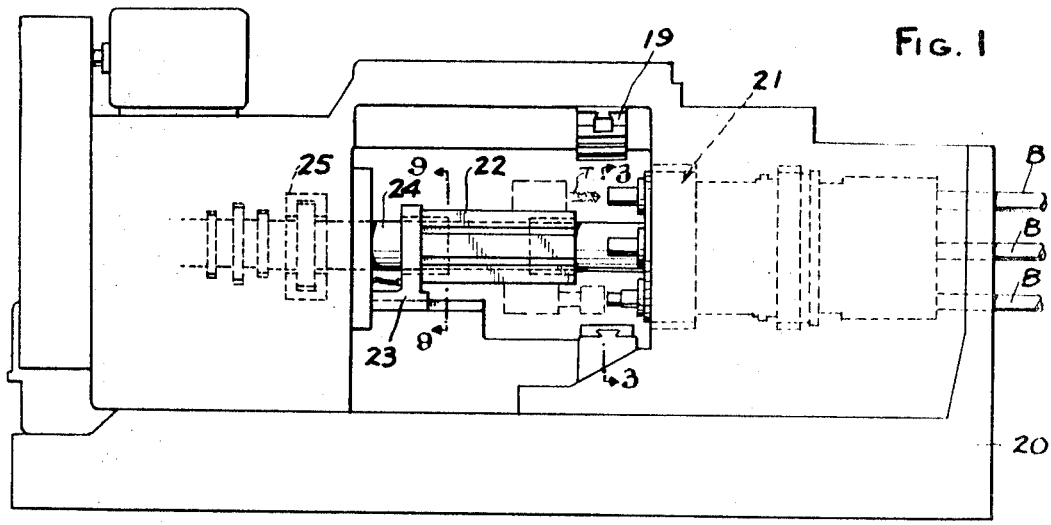
FIG. 1 is a side elevational view of a machine embodying the invention.

Referring to FIG. 1, the multiple spindle bar automatic machine comprises a base 20 which has a carrier 21 rotatably mounted therein and adapted to be indexed to bring successive workpiece W from bar stock B into position for engagement with tools T that are supported on a tool support 22 for movement axially toward and away from the workpieces W. Tool support 22 is, in turn, supported on a slide 23 on the base which is movable axially with respect to a shaft 24 that has a thrust bearing 25 at one end thereof.

Figure 2:
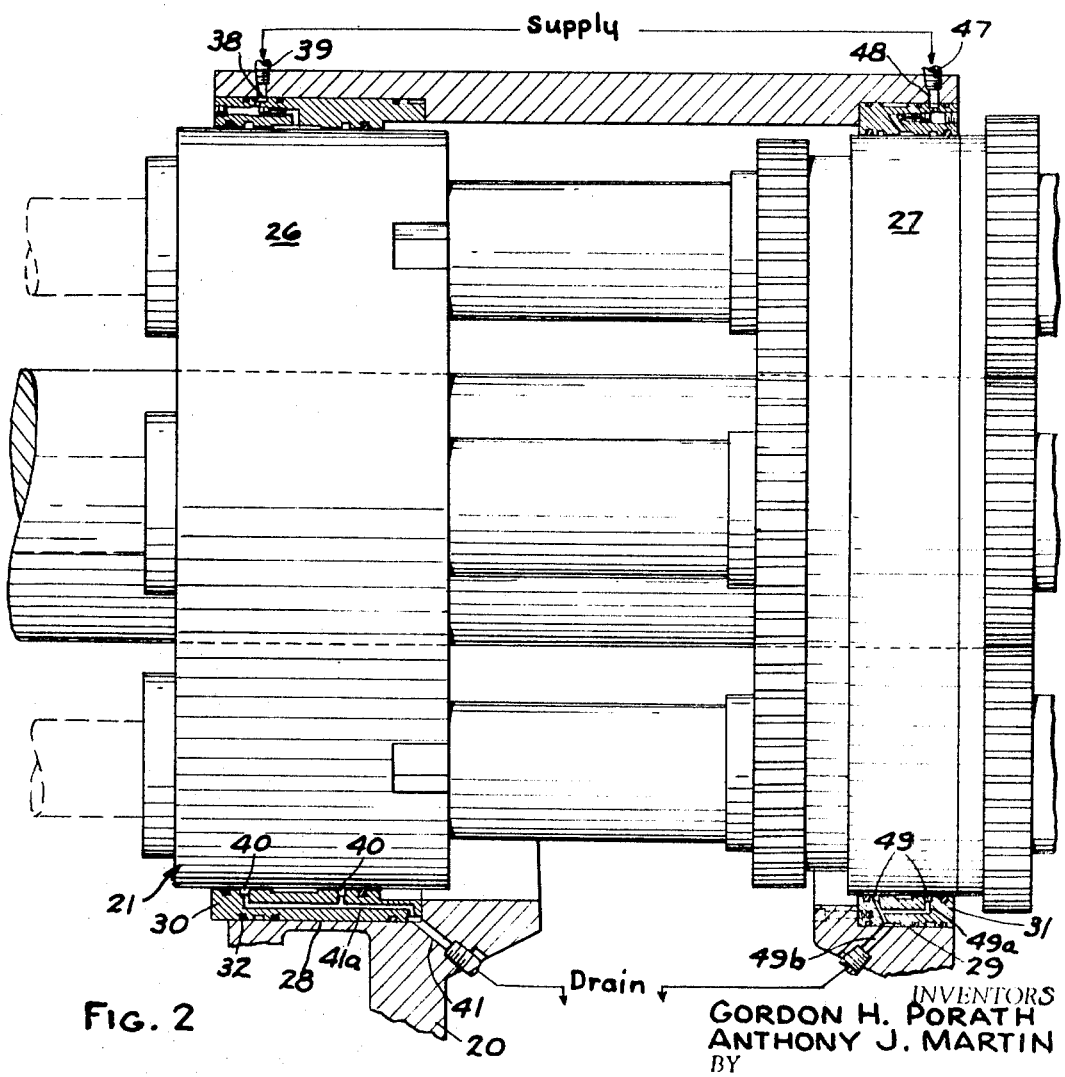
FIG. 2 is a sectional view taken along the line 2-2 in FIG. 3.
Figure 3:
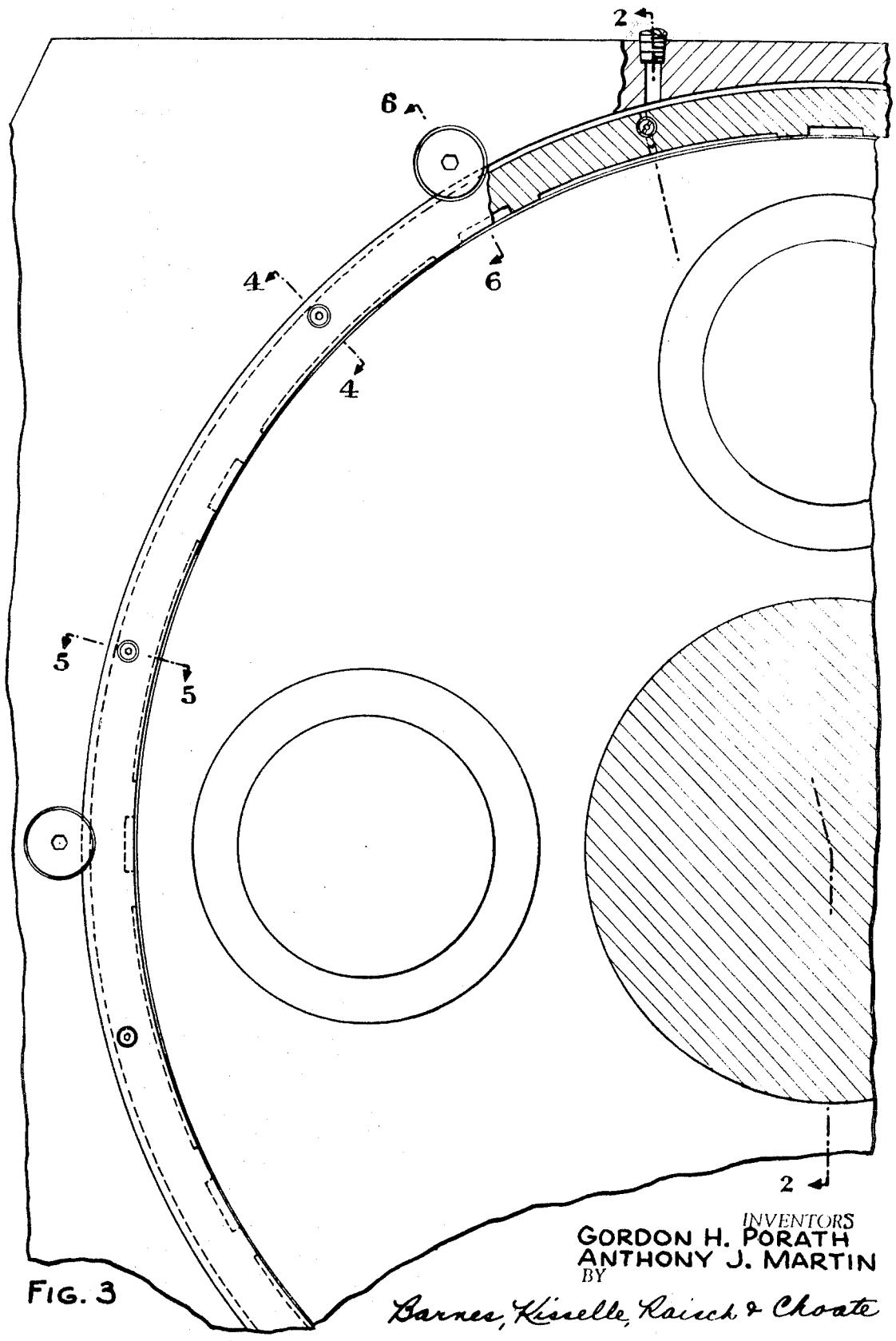
FIG. 3 is a fragmentary sectional view on an enlarged scale taken along the line 3-3 in FIG. 1.
Figure 7:
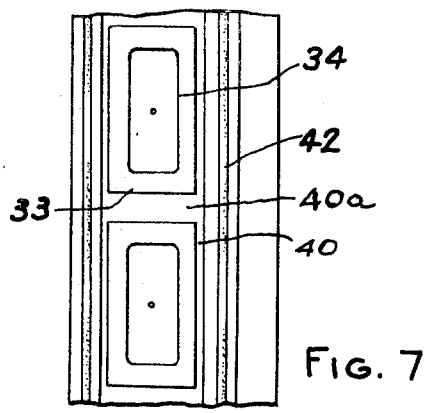
FIG. 7 is a plan view of a portion of the machine.
Figure 8:
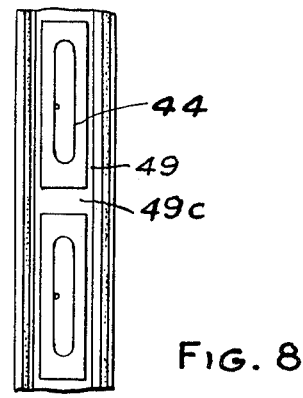
FIG. 8 is a plan view of another portion of the machine.

As shown in FIG. 2, the carrier 21 is of conventional construction and includes spaced axially extending cylindrical surfaces 26, 27. The base 20 includes cylindrical openings 28, 29 in which bearing inserts 30, 31 are positioned. Each of the bearing inserts has O-rings 32 positioned in annular seats for providing a seal between the base 20 and the insert 30, 31 as the case may be.

Specifically, as shown in FIG. 4, bearing insert 30 further has an inner cylindrical surface 33 juxtaposed to the cylindrical surface 26 of the spindle 21. Surface 33 has circumferentially spaced pressure pads or pockets 34 therein. A restrictor 35 in the form of a capillary tube is threaded into a passage 36 extending into each pocket. Fluid under pressure is supplied to each restrictor and, in turn, to each pressure pad through a passage 37 extending from an annular passage 38 to which fluid is supplied from an external source through an inlet 39. The fluid flows in a thin film between the surfaces 33, 26 to annular drain passages 40 and then outwardly through passages 41a to a drain passage 41. O-rings 42 positioned in seat 43 in the insert 30 confine the fluid and prevent it from moving laterally outwardly. Annular drain passages 40 are joined by channels 40a.

As shown in FIG. 5, similarly insert 31 has an inner cylindrical surface 43 with circumferentially spaced pressure pads 44 therein and a passage 45 communicating with each pressure pad in which a restrictor 46 in the form of a capillary tube is inserted. Fluid is supplied under pressure through an inlet 47 and passes to each restrictor through a passage 48 and annular passage 48a. The fluid flowing from each pressure pad flows outwardly between the surfaces 43, 27 to drain openings 49, through passages 49a and then is collected through an outlet drain passage 49b. O-rings 50 seated in grooves 51 confine the fluid and prevent it from moving axially. Annular drain passages 49 are joined by channels 49c.

As shown in FIG. 6, each of the inserts 30, 31 is held in position by a bolt 52 which is threaded into the body 20 and the head of each bolt engages a shoulder 53 on the corresponding insert.

Figure 9:
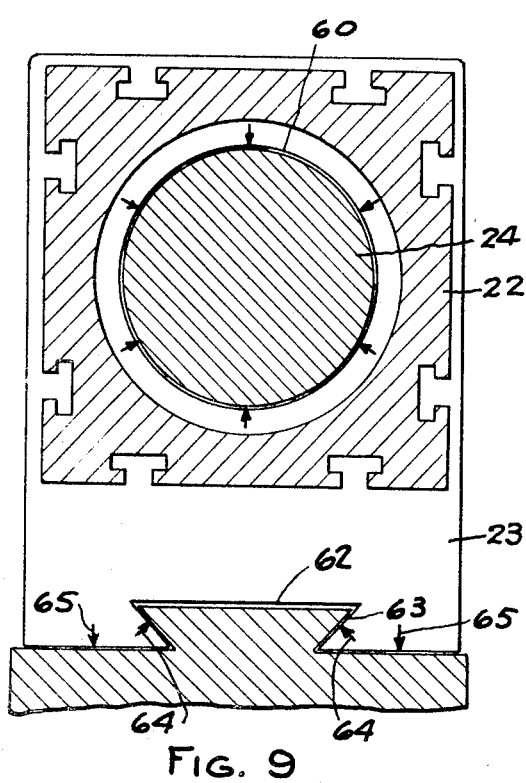
FIG. 9 is a fragmentary partly diagrammatic sectional view taken along the line 9-9 in FIG. 1.

Support of the same type is provided between the shaft 24 and the tool support 22 as shown in FIG. 9 and comprises a cylindrical opening 60 in the tool support that has circumferentially spaced pressure pads therein, represented by the arrows, and associated restrictors to which fluid under pressure flows. Similarly, a dovetail connection is provided between the slide 23 and the base comprising a dovetail groove 62 and a dovetail 63 including pressure pads 64, 65 and associated restrictors on the slide.

Figure 10:
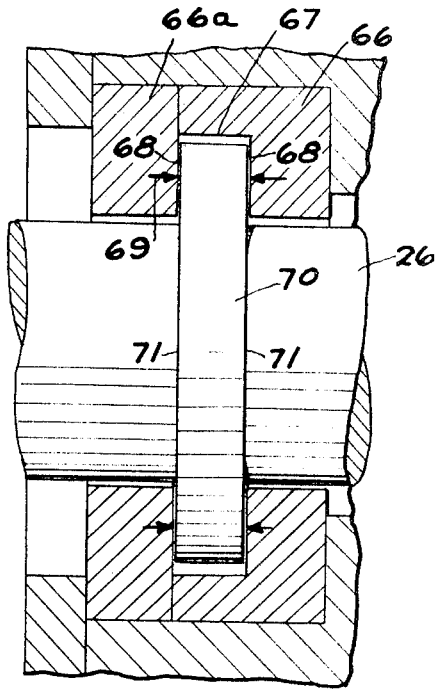
FIG. 10 is a partly diagrammatic view of another portion of the machine shown in FIG. 1.

A thrust bearing 25 is also provided on the shaft 24 and as shown in FIG. 10, comprises a two-piece annular insert 66, 66a of bolted construction (not shown) which has an annular groove 67 including radially extending surfaces 68, each of which has circumferentially spaced pressure pads 69 and associated restrictors therein. A radial flange 70 with complementary surfaces 71 is provided on the shaft 26.

The space between the surfaces 26, 33 and 27, 43 and the surface of the shaft 24 and surface 60, and the complementary surfaces of the dovetail in FIG. 9 and the bearing in FIG. 10 are such that a film of fluid flows continuously at low velocity therebetween. The space may range between two-thousandths of an inch and one ten-thousandth of an inch and preferably between one-thousandths of an inch and one ten-thousandths of an inch.

We claim:

1. In a multiple spindle bar automatic machine, the combination comprising
   a base,
   a spindle carrier having a plurality of circumferentially spaced rotatable spindles that are adapted to be driven,
   said base having longitudinally spaced cylindrical surfaces,
   said spindle carrier having complementary spaced cylindrical surfaces to permit said spindle carrier to be rotatably indexed relative to said base,
   the surfaces on one of said base and said spindle carrier having circumferentially spaced pressure pads thereon,
   a restrictor associated with each said pressure pad,
   and means for supplying fluid under pressure to each said restrictor whereby a thin film of liquid flows from each said pressure pad between said complementary surfaces,
   longitudinally spaced inserts on said base,
   said cylindrical surfaces being provided on said inserts,
   said restrictors and said means for supplying fluid being provided on said inserts.

2. The combination set forth in claim 1 wherein each of said inserts is removable.